United States Patent Office 3,287,451
Patented Nov. 22, 1966

3,287,451
PROCESS FOR THE PREPARATION OF 2,3-DICHLOROPYRAZINE
Adolfo Carrara, Anselmo Leone, and Danilo Fabris, Turin, Italy, assignors to Società Farmaceutici Italia, Milan, Italy, a corporation of Italy
No Drawing. Filed Nov. 9, 1964, Ser. No. 409,980
Claims priority, application Italy, Nov. 11, 1963, 23,058/63
5 Claims. (Cl. 260—250)

Our invention relates to a new process for preparing 2,3-dichloropyrazine. We prepare 2,3-dichloropyrazine by reacting piperazine with phosgene under suitable conditions to yield N,N'-bis-chlorocarbonyl-piperazine which is then chlorinated to yield 2,3-dichloropyrazine.

2,3-dichloropyrazine is an important intermediate for the preparation of pyrazine derivatives having several industrial uses, such as insecticides, synthetic fibers, detergents, ion exchange resins (see, for example, U.S. Patent No. 2,573,268). 2,3-dichloropyrazine is also an intermediate in the preparation of the therapeutically useful 3-alkoxy-2-sulphanilamidopyrazine. 2,3-dichloropyrazine, on reaction with ammonia, may be converted into 2-amino-3-chloropyrazine which in turn, on reaction with an alkali methylate, yields 2-amino-3-methoxy-pyrazine, from which 3-methoxy-2-sulphanilamido-pyrazine may be obtained according to Camerino et al. Patent No. 3,098,069.

The literature (L. Bernardi et al., Gazz. Chim. It. 91, 1961, page 1434) teaches the preparation of 2,3-dichloropyrazine by chlorination of the 2,3-dihydroxy-pyrazine, which is prepared from aminoacetaldehyde and dialkyl-oxalate in a 3-step process. Operating in this manner, 2,3-dichloropyrazine is obtained through a series of 4 steps, while our invention has as an object preparing 2,3-dichloropyrazine through only 2 steps starting from piperazine.

Recently, H. Holtschmidt (Angew, Chem., Int. Ed., vol. I, 1962, page 652) described a chlorination method of carbamoyl chlorides of secondary cyclic amines at high temperature. According to Holtschmidt, an X,X-dichloropyrazine, besides other perchlorinated products, may be obtained starting from N,N'-bis-chlorocarbonyl-piperazine which may be prepared by reacting anhydrous piperazine in xylene with phosgene.

The same compound may be prepared according to Morren and Denayer (Bull. Soc. Chim. Belges, 58, 1949, pages 103–111) on reacting phosgene dissolved in toluene with anhydrous piperazine in benzene. Nevertheless, the above-said Belgian authors report a melting point of 240° C., which is markedly different from that reported by Holtschmidt who discloses a melting point of 158–160° C., confirmed herein.

According to H. Holtschmidt, the chlorination of N,N'-bis-chlorocarbonyl-piperazine is carried out by reacting molten N,N'-bis-chlorocarbonyl-piperazine with gaseous chlorine at a temperature of 160–165° C. and then at 190–200° C. and under U.V. irradiation. A chlorinated product mixture would be formed whose approximate composition would be 80% of X,X-dichloropyrazine and 5.5% of trichloropyrazine. The author, however, does not report the structural formula of dichloropyrazine or dichloropyrazines he obtains thereby. Obviously, this method which enables to obtain a mixture of tricholopyrazine and dichloropyrazines whose composition vary according to the experimental conditions, such as temperature, time of contact, exposure to U.V., is not favorable for the preparation of 2,3-dichloropyrazine as a unitary product. Moreover, for an industrial process, the use of anhydrous piperazine as starting material creates great technical difficulties.

We have found that phosgenating piperazine-hexahydrate as commercially available in a diphase aqueous organic system gives N,N'-bis-chlorocarbonyl-piperazine with good yields and that, upon reacting N,N'-bis-chlorocarbonyl-piperazine with chlorine in the warm, in the presence of catalytical amounts of a compound taken from the group of trivalent metal chlorides such as AlCl₃, FeCl₃, SbCl₃ under the optional influence of visible and U.V. light excellent yields of 2,3-dichloropiperazine are obtained as a unitary product which is practically free from monochloropyrazine, from the isomer, 2,6-dichloropyrazine and from tri- and tetrachloropyrazines.

The process of the present invention may be illustrated by the following:

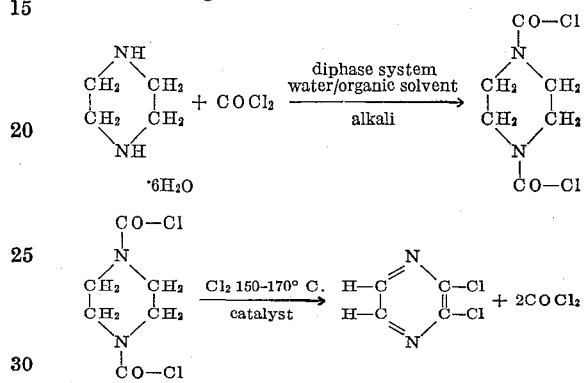

The phosgenation reaction (first step) is carried out in a two-phase water/water-immiscible organic solvent system, which is inert towards phosgene, preferably in the presence of a basic substance as an acceptor for the hydrochloric acid developed during the reaction. The phosgenation reaction may be performed either by dripping aqueous solutions of piperazine and of the alkaline acceptor into a separately prepared phosgene solution in the organic solvent, or by bubbling the phosgene into a mixture of the solution or the aqueous suspension of the alkaline acceptor and of piperazine hexahydrate in the solvent employed. As mentioned above, the phosgenation reaction is carried out in a two-phase water/water-immiscible organic solvent system inert towards phosgene. The organic solvent is preferably a chlorine containing lower aliphatic hydrocarbon, for example chloroform, carbon tetrachloride, dichloromethane, dichloroethane, or trichloroethylene. The phosgenation reaction is carried out in the presence of an acid acceptor, preferably a basic substance, for example an alkali metal or alkaline earth metal hydroxide, acetate, carbonate or bicarbonate. The phosgenation temperature is from −10° to +20° C. and is preferably from −5° to 0° C. The amount of phosgene employed is from 2 to 4 mols/per mol of piperazine, and is preferably 3 mols.

The chlorination reaction of the intermediate N,N'-bis-chlorocarbonyl-piperazine is carried out by reacting molten N,N'-bis-chlorocarbonyl-piperazine with chlorine at a temperature of 150–170° C. in the presence of catalytic amounts of a compound selected from the group consisting of aluminum chloride, ferric chloride and antimony chloride, either under the influence of U.V. light or visible light or in the dark. When the reaction is over, 2,3-dichloropyrazine may be isolated by distillation in vacuo.

The following examples illustrate the invention without intent to limit it.

EXAMPLE 1

*N,N'-bis-chlorocarbonyl-piperazine*

71.2 g. of phosgene (0.72 M) are dissolved in 1000 cc. of cold dichloromethane, 60 g. of sodium carbonate (0.56 M) in 450 cc. of water and 33 g. of piperazine hexahydrate (0.18 M) in 150 cc. of water added dropwise during one hour, while the temperature is kept between —5° and 0° C. The mixture is kept for an additional hour at the same temperature with stirring and then is slowly warmed up to 10° C. The organic layer is separated, washed with water and evaporated to dryness. 34 g. of a white crystalline product are obtained, melting at 152–156° C. On crystallization from boiling toluene, 30 g. of white crystalline product, melting at 157–160° C., are obtained. Yield in recrystallized product: 79% of the theoretical value.

The same results were obtained when the dichloromethane was replaced by other chlorinated lower aliphatic hydrocarbons, such as chloroform, carbon tetrachloride, dichloroethane and trichloroethylene.

EXAMPLE 2

*N,N'-bis-chlorocarbonyl-piperazine*

119 g. of phosgene (1.2 M) are dissolved in 1000 cc. of dichloromethane, whereupon 58.2 g. of piperazine hexahydrate (0.3 M) dissolved in 200 cc. of water and a suspension of 164 g. of sodium bicarbonate (2 M) in 1000 cc. of water are added dropwise during one hour, while the temperature is kept between 0° and +10° C. The mixture is stirred for an additional hour, the product is then separated and purified as in Example 1. 45.8 g. of recrystallized product are obtained, melting at 157–160° C.

The same results were obtained when the dichloromethane was replaced by other chlorinated lower aliphatic hydrocarbons, such as chloroform, carbon tetrachloride, dichloroethane and trichloroethylene.

EXAMPLE 3

*N,N'-bis-chlorocarbonyl-piperazine*

48.5 g. of piperazine hexahydrate (0.25 M) and 106 g. of sodium carbonate (1 M) are dissolved in 1000 cc. of water, and 500 cc. of dichloromethane are added. The mixture is cooled to between 0° and —5° C. and over a period of 4 hours 99 g. of phosgene (1 M) are bubbled into the mixture. The mixture is then stirred for an additional hour at the same temperature, after which the temperature is allowed to rise spontaneously to 10° C. The organic layer is separated, the aqueous layer is extracted with a small amount of dichloromethane, and the combined organic layers are washed with water and evaporated to dryness. 47 g. of white crystalline product are obtained, melting at 148–155° C. On recrystallization from boiling toluene, 39 g. of product, melting at 155–160° C., are obtained.

The same results were obtained when the dichloromethane was replaced by other chlorinated lower aliphatic hydrocarbons, such as chloroform, carbon tetrachloride, dichloroethane and trichloroethylene.

EXAMPLE 4

*N,N'-bis-chlorocarbonyl-piperazine*

48.5 g. of piperazine hexahydrate (0.25 M) and 138 g. of potassium carbonate (1 M) are dissolved in 1000 cc. of water. 500 cc. of dichloromethane are then added and the whole is cooled to between —4° and +4° C. 99 g. of phosgene (1 M) are bubbled in at this temperature during 3 hours and then the product is separated and purified as in Example 3. 38 g. of recrystallized product are obtained melting at 157–160° C.

The same results were obtained when the dichloromethane was replaced by other chlorinated lower aliphatic hydrocarbons, such as chloroform, carbon tetrachloride, dichloroethane and trichloroethylene.

EXAMPLE 5

*N,N'-bis-chlorocarbonyl-piperazine*

To a solution of 48.5 g. of piperazine hexahydrate (0.25 M) and 74.8 g. of sodium acetate trihydrate in 600 cc. of water, 600 cc. of dichloromethane are added and the whole is cooled to between 0° and —5° C. 99 g. of phosgene are then bubbled into the mixture during 4 hours, which is stirred for an additional hour at the same temperature, after which the temperature is allowed to rise to 10° C. The two layers are separated and the aqueous layer is extracted with a small amount of dichloromethane. The combined organic extracts are washed with water to extract all of the acetic acid present. The resulting solution in dichloromethane is evaporated to dryness. 44 g. of white crystalline product are obtained, melting at 150–157° C. On recrystallization from boiling toluene, 39.2 g. of white crystalline product are obtained, melting at 156–160° C.

The same results were obtained when the dichloromethane was replaced by other chlorinated lower aliphatic hydrocarbons, such as chloroform, carbon tetrachloride, dichloroethane and trichloroethylene.

EXAMPLE 6

*N,N'-bis-chlorocarbonyl-piperazine*

To a solution of 48.5 g. of piperazine hexahydrate (0.25 M) and 54 g. of potassium acetate (0.55 M) in 600 cc. of water, 600 cc. of dichloromethane are added and the whole is cooled to between 0° and —5° C. During 3 hours, 99 g. of phosgene are bubbled into the solution, always keeping the temperature between 0° and —5° C. The product is separated and purified as in Example 5. 40 g. of recrystallized product are obtained, melting at 156–160° C.

The same results were obtained when the dichloromethane was replaced by other chlorinated lower aliphatic hydrocarbons, such as chloroform, carbon tetrachloride, dichloroethane and trichloroethylene. Substitution of alkali and alkali-earth hydroxides for potassium acetate gives the same results.

EXAMPLE 7

*N,N'-bis-chlorocarbonyl-piperazine*

48.5 g. of piperazine hexahydrate (0.25 M) are dissolved in 300 cc. of water. 60 g. of calcium carbonate and 500 cc. of dichloromethane are then added and the suspension thus obtained is cooled to between 0° and —2° C. 75 g. of phosgene are bubbled in over a period of 2 hours with strong stirring of the solution and always keeping the temperature in the above range. The solution is stirred for additional 2 hours, whereupon the temperature is allowed to rise to 15–20° C. in half an hour. The product is separated and purified as in Example 6. 40 g. of recrystallized product are obtained, melting at 154–158° C.

The same results were obtained when the dichloromethane was replaced by other chlorinated lower aliphatic hydrocarbons, such as chloroform, carbon tetrachloride, dichloroethane and trichloroethylene.

EXAMPLE 8

*2,3-dichloropyrazine*

Into a glass chlorination apparatus 20 g. of N,N'-bis-chlorocarbonyl-piperazine, 0.2 g. of ferric chloride and 150 g. of chlorine-resistant clay filling, such as Raschig rings or small glass spheres, well mixed, are introduced.

The apparatus is immersed into an oil bath thermoregulated at 155–160° C. and U.V. lamp is placed near it. As soon as melting begins, chlorine is bubbled in at a rate of 15–16 g. per hour. After about ten hours of chlorination, the mass is cooled, transferred into a Claisen distillation flask, and rinsed thoroughly with dichloromethane. When the solvent has been eliminated, the residue is distilled at reduced pressure (14 mm. Hg) by collecting the fraction which passes at 82–85° C. 11.3–12.7 g. of product (79–89% of the theoretical value) are obtained. Under gas chromatographic analysis the product appears practically unitary.

EXAMPLE 9

*2,3-dichloropyrazine*

The preparation is carried out in the same way as in Example 8. By replacing a U.V. lamp with a lamp giving visible light, analogous results are obtained.

EXAMPLE 10

*2,3-dichloropyrazine*

The preparation is carried out in the same way as in Example 8, but in complete absence of sources of light. Analogous results are obtained.

EXAMPLE 11

*2,3-dichloropyrazine*

The preparation is carried out in the same way as in Example 8, but replacing ferric chloride with another trivalent chloride (aluminum chloride in one case and antimony chloride in another). The same results are obtained. When operating as in Example 8, but without a catalyst, the yields were considerably lower. Higher temperatures and longer reaction periods result in perchlorinated products.

We claim:

1. A process for the preparation of 2,3-dichloropyrazine, which comprises reacting piperazine hexahydrate dissolved in water with phosgene, in the presence of an acid acceptor, in a chlorinated lower aliphatic hydrocarbon at a temperature between —10° and +20° C., preferably between —5° and 0° C., to yield N,N'-bis-chlorocarbonyl-piperazine which in turn is reacted with chlorine at a temperature of from 150° to 170° C., in the presence of catalytic amounts of a compound selected from the group consisting of aluminum chloride, ferric chloride and antimony chloride, for 9 to 15 hours to yield 2,3-dichloropyrazine.

2. The process of claim 1, wherein 2 to 4 moles of phosgene are used per mole of piperazine hexahydrate.

3. A process for the preparation of 2,3-dichloropyrazine, which comprises reacting piperazine hexahydrate dissolved in water with phosgene, in the presence of an acid acceptor, in a chlorinated lower aliphatic hydrocarbon selected from the group consisting of chloroform, carbon tetrachloride, dichloromethane, dichloroethane and trichloroethylene, at a temperature between —10° and +20° C., preferably between —5° and 0° C., to yield N,N'-bis-chlorocarbonyl-piperazine which in turn is reacted with chlorine at a temperature of from 150° to 170° C., in the presence of catalytic amounts of a compound selected from the group consisting of aluminum chloride, ferric chloride and antimony chloride, for 9 to 15 hours to yield 2,3-dichloropyrazine.

4. A process for the preparation of 2,3-dichloropyrazine, which comprises reacting piperazine hexahydrate dissolved in water with phosgene, in the presence of an acid acceptor selected from the group consisting of alkali and earth-alkali hydroxides, acetates, carbonates and bicarbonates, in a chlorinated lower aliphatic hydrocarbon at a temperature between —10° and +20° C., preferably between —5° and 0° C., to yield N,N'-bis-chlorocarbonyl-piperazine which in turn is reacted with chlorine at a temperature of from 150° to 170° C., in the presence of catalytic amounts of a compound selected from the group consisting of aluminum chloride, ferric chloride and antimony chloride, for 9 to 15 hours to yield 2,3-dichloropyrazine.

5. A process for the preparation of 2,3-dichloropyrazine, which comprises reacting piperazine hexahydrate dissolved in water with phosgene, in the presence of an acid acceptor, in a chlorinated lower aliphatic hydrocarbon at a temperature between —10° and +20° C., preferably between —5° and 0° C., to yield N,N'-bischlorocarbonyl-piperazine which in turn is reacted with chlorine at a temperature of from 150° to 170° C. in the presence of from about 0.05 to 0.5% by weight of a compound selected from the group consisting of aluminum chloride, ferric chloride and antimony chloride, for 9 to 15 hours to yield 2,3-dichloropyrazine.

No references cited.

NICHOLAS S. RIZZO, *Primary Examiner.*